Figure 16:
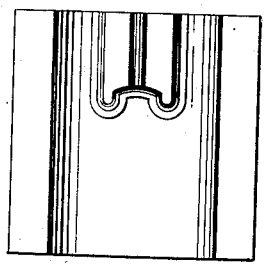

G. E. RYDER.
DIES FOR MAKING RETURN BENDS.
APPLICATION FILED APR. 6, 1920.
1,417,944.
Patented May 30, 1922.
2 SHEETS—SHEET 1.
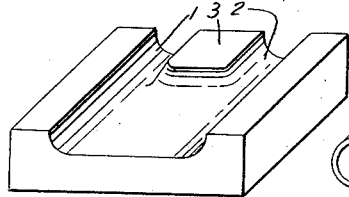
Fig. 1.
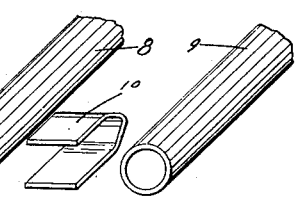
Fig. 2.
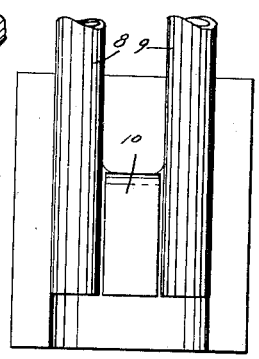
Fig. 3.
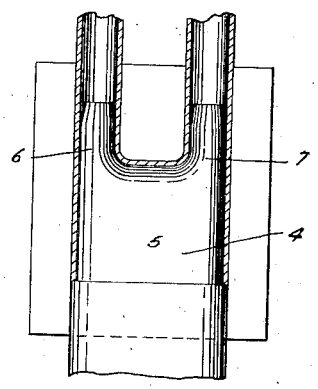
Fig. 4.
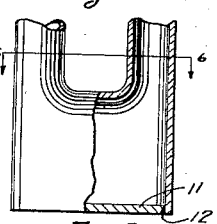
Fig. 5.
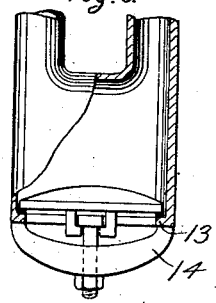
Fig. 8.
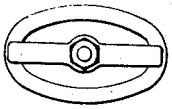
Fig. 6.
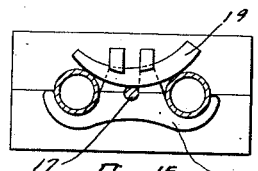
Fig. 15.
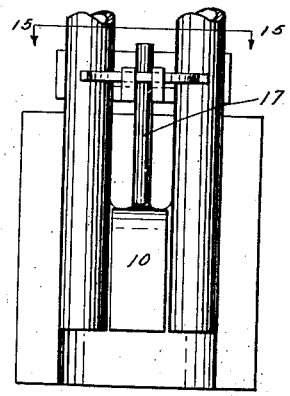
Fig. 14.
Fig. 7.
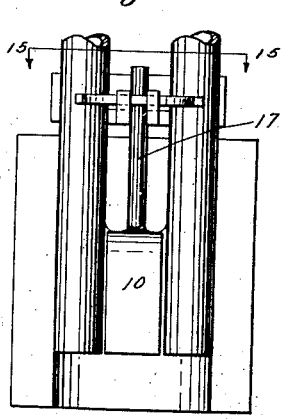
Fig. 9.
Fig. 10.
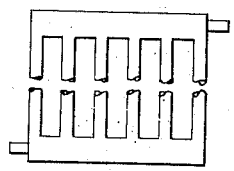
Fig. 11. Fig. 12.
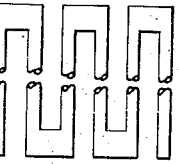
Fig. 13.
GILBERT E. RYDER, Inventor
By HIS Attorney O. V. Thiele

G. E. RYDER.
DIES FOR MAKING RETURN BENDS.
APPLICATION FILED APR. 6, 1920.

1,417,944.

Patented May 30, 1922.
2 SHEETS—SHEET 2.

GILBERT E. RYDER Inventor
By HIS Attorney O. V. Thiele

UNITED STATES PATENT OFFICE.

GILBERT E. RYDER, OF LEONIA, NEW JERSEY.

DIES FOR MAKING RETURN BENDS.

1,417,944.  Specification of Letters Patent.  Patented May 30, 1922.

Original application filed May 1, 1919. Serial No. 294,100. Divided and this application filed April 6, 1920. Serial No. 371,655.

*To all whom it may concern:*

Be it known that I, GILBERT E. RYDER, a citizen of the United States, residing at Leonia, in the county of Bergen and State of New Jersey, have invented new and useful Improvements in Dies for Making Return Bends, of which the following is a specification.

My invention relates to return bends and similar devices and has for its purpose the provision of novel structures of this kind and of apparatus for making them.

The present application is a division of Serial Number 294,100, filed May 1, 1919.

A discussion of my invention may best be begun by a reference to the form of return bend usually referred to as a "forged return bend." In this structure the return bend is made up of a portion of the pipes themselves which are joined. The method of making such return bends and the apparatus used are sufficiently well-known at the present time so that no detailed description thereof is required herein. They are fully set forth in U. S. Patents 1,155,109 to True and McKee; 1,169,209 to the same, and 1,255,355 to True and Brandt. The Patent 1,264,455 to True discloses an extension of the idea, and will be referred to farther on.

As will appear from the specifications in the patents mentioned and as is well known to those conversant with this art, there is a certain limitation in the method and apparatus previously employed. This limitation resides in the fact that the distance which the pipes to be joined can be placed apart cannot be varied beyond certain limits one way or the other since there is a definite amount of the material of the pipes which is bent outward to form the connecting portion. If the pipes are spaced too far apart, there will not be enough of this material and if they are placed too close together there will be an excessive amount. By the method and apparatus disclosed in this specification, the distance which the two pipes can be placed apart can be made anything desired within reason.

The invention will be readily understood from the following description which is to be read in connection with the accompanying drawings.

Figure 18:
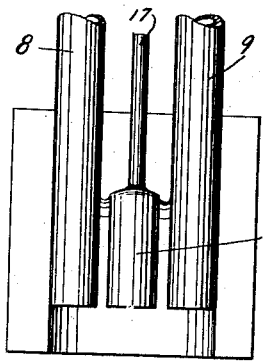
Figure 20:
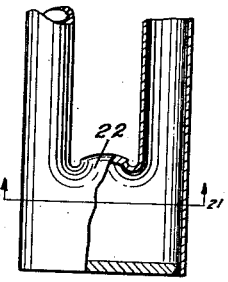
Figure 17:
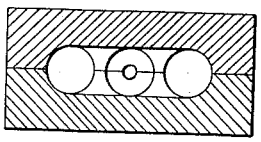
Figure 21:
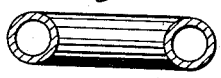
Figure 19:
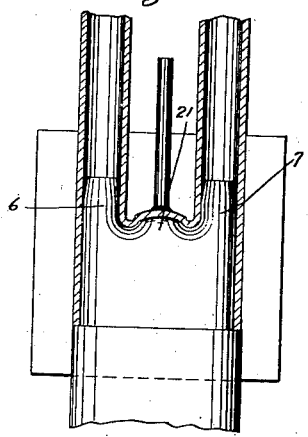
Figure 26:
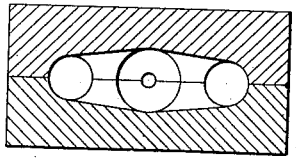
Figure 23:
Figure 27:
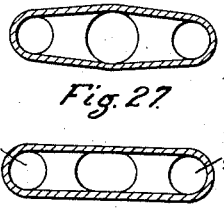
Figure 22:
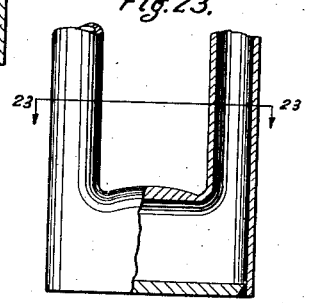
Figure 24:
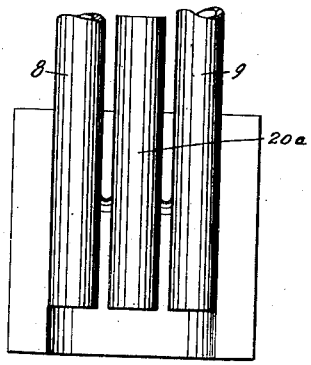
Figure 25:
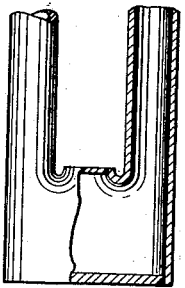
Figure 29:
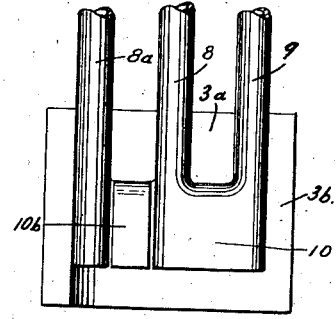

In these drawings, Fig. 1 represents one half of the female die employed in my process; Fig. 2 shows the two pipes to be joined and a connecting piece between them which is required in carrying out my process; Fig. 3 shows in a plan view one half of the female die with the three parts of Fig. 2 in position. Fig. 4 is similar to and illustrates the work of Fig. 3 after the male portion of the die has performed its inward movement, the male die being shown at this part of its stroke; Fig. 5 shows a plan view partly in section of a completed return bend made by my method; Fig. 6 is a view taken on line 6—6 of Fig. 5 looking in the direction indicated by the arrows; Fig. 7 shows a variation of the step by which the return bend is finally closed; Fig. 8 shows another variation in this step; Fig. 9 is an end view of Fig. 8; Fig. 10 illustrates how the structure made by the first portion of my process is joined to a third pipe instead of being shaped into a return bend; Fig. 11 is an end view of Fig. 10. Figs. 12 and 13 show on a reduced scale, structures made by my process; Fig. 14 is a view similar to Fig. 3, showing a modification which facilitates holding the parts to be joined; Fig. 15 is a section on line 15—15 of Fig. 14, looking in the direction indicated by the arrows; Fig. 16 is a plan view of one half of the female die employed in a variation of my process; Fig. 17 is a sectional view of the two halves of the female die used in this modification, in closed position; Fig. 18 is a view similar to Fig. 3 illustrating this variation in my process; Fig. 19 is a view similar to Fig. 4 of this variation; Figs. 20 and 21 illustrate a return bend made by this variation; Figs. 22 and 23 illustrate an additional operation; Figs. 24 and 25 illustrate a further modification; Fig. 26 shows a die used in a still further variation in my method; Fig. 27 is a sectional view of a partially completed return bend made in the die of Fig. 26; Fig. 28 shows in sectional view this return bend completed; Fig. 29 shows a die used in making the structure of Fig. 12.

Referring first to the form of my apparatus and method, and the resulting structure as illustrated in Figs. 1 to 6, it will be seen that the die I employ is similar to the one of the patented method referred to above. The principal distinction lies in the fact that the two bores 1 and 2 are placed farther apart, the wall 3 between them being of greater width than in the die hitherto employed. A similar and corresponding modification is seen in the male die 4 in which the portion 5 between the two legs 6 and 7 is seen to be wider than in the patented die. An inspection of Fig. 3 will make clear the relative position into which the two pipes 8, 9 and the connecting piece 10 are placed. The ends of the pipes 8 and 9 as well as the connecting piece 10 are suitably heated before they are placed in position and it will be understood that the other half of the female die, which is symmetrical with the one shown, is placed into and then held in the proper position after the heated parts have been inserted. The male die which, just as in the process hitherto employed, is by suitable mechanism now caused to perform its inward stroke, splits those portions of pipe 8 and 9 which face each other and bends them outward, upward and downward, much in the same way as in the old process. Instead, however, of the edges of these split portions coming into contact with each other they are brought into forcible contact with the edges of the connecting piece 10, this contact being such that a good weld results. This will be readily understood by those conversant with this art as hitherto practised.

After the male die has performed its inward stroke it is, by the mechanism to which it is attached, withdrawn, the female die is opened and the incomplete return bend removed. There now remains the step of closing this incomplete return bend. This may manifestly be accomplished in one of several different ways. As illustrated in Fig. 5, the closure is accomplished by inserting a cover piece 11 of suitable shape into the opening and welding it along the edge, as indicated at 12. In the form illustrated in Fig. 7, the open end of the return bend is swaged down and closed very much after the manner of Patent 1,255,355 mentioned above. In the form illustrated in Figs. 8 and 9, the outer edge of the incomplete bend is turned inward as indicated at 13, after which a cover 14 similar to the ordinary hand hole cover is inserted and held in place by the means shown, or any other preferred means.

In Fig. 10, there is illustrated the use of a structure made by my process not as a return bend but as a means for joining two pipes to a third. This third pipe 15 is belled out, as shown, so that its end registers with the open end of the structure made in the dies above described. The two are then welded together along the line 16. If desired, the open end of the incomplete structure resulting from the operation of the dies of Figs. 1, 3 and 4 may evidently be drawn down directly into circular form so that the structure assumes the shape of Fig. 10; no weld, as at 16, being then required. The circular open end can then be connected by any desired means to a pipe, header or other element. The size to which the end is drawn down depends upon circumstances.

In Fig. 13, a series of pipes is shown whose alternate ends are connected to each other by my process.

The structure of Fig. 12 is produced in a die involving an obvious extension of my inventive idea and illustrated in Fig. 29. Only one-half of the female die is shown, it being understood that the other half is symmetrical with that shown. Pipes 8 and 9, and the connecting piece 10 are first joined in the left portion of the die, which is strictly similar to the die of Figs. 1, 3 and 4. The male die is exactly like that of Fig. 4, and its legs enter the left and center bores of the female die. The resulting structure is then placed into the position indicated in Fig. 29, the die being provided with the raised portion $3^a$, but having no raised wall on the side $3^b$. Pipe $8^a$ and connecting piece $10^b$ are placed in position, both they and the proper portion of pipe 8 having, of course, been suitably heated; and are joined by a stroke of the male die. Evidently the process can be repeated as often as desired, the finished portion of the structure being fed outward at $3^b$, and new pipes and connecting pieces being supplied at the left end. The whole process is similar to that of the Patent 1,264,455, mentioned supra; and will be at once understood by those versed in this art. The other ends of the pipes are thereafter joined by a similar series of operations; the open tops of the resulting headers closed in any preferred manner; and suitable connections supplied. These latter steps are not a part of my present invention, and a detailed description would be out of place.

In practise it will not be convenient to heat the two pipes 8 and 9 and the connecting piece 10 separately and then to insert them into the die, and Figs. 14 and 15 illustrate my preferred method and means of holding these three pieces in their relative position so that they may be simultaneously heated and handled. The connecting piece 10 will be seen to have attached to it a projecting extension 17. A suitable bore to accommodate this extension 17 is made in the female dies as is clearly shown in Fig. 15. The clamp 18, together with its key 19 holds these three pieces positively in the relation desired so that they may be inserted together into the furnace and generally conveniently handled. The process by which the three are joined is not modified in any way. After the operation of joining them is completed, the extension 17 is removed in any preferred manner.

Instead of using a connecting piece of the form shown in the figures hitherto spoken of, it may under certain conditions be desirable to use a short third pipe as in the modification next to be described. This third piece of pipe, which is given a reference numeral 20 (see Fig. 18) may or may not have the extension 17. In Fig. 18, it is shown as being provided with it and in that case it will be understood a clamp similar to the one in Fig. 14 is to be employed and later on the extension 17 is to be removed in a similar way. The form of the female and male dies employed in this modification of my process will be apparent from Figs. 16, 17 and 18. The two pipes to be joined, 8 and 9, as well as the connecting piece 20, are shown in position in Fig. 18, only the lower half of the female die being shown in this figure. The connecting piece 20 is in the form of a short length of pipe or a thimble closed at its inner end. The male die, as will be seen from Fig. 19, has two legs corresponding to 6 and 7 in the form above described, but is supplied in addition with a short central projection or leg 21. As the male die performs its inward stroke, the neighboring walls of pipes 8 and 9 and the connecting piece 20 are split by the legs 6, 7 and 21, bent outward in the same known way coming into contact with each other again with just the requisite pressure to form a good weld. The resulting structure is clearly shown at Figs. 19 and 20. The small projection 22 is, of course, useless and may even be objectionable in some cases. It is reduced to a minimum by making the leg 21 as short as is compatible with the proper action of the die, and letting pipe 20 extend inward between the two pipes 8 and 9 no farther than absolutely necessary. If it is desired to flatten down this projection entirely this can evidently be done readily by hand or in a suitable set of dies so that the resulting structure becomes smooth at this point as indicated in Figs. 22 and 23. The end of this return bend can evidently be closed by any of the methods mentioned in connection with the first form above or by any other preferred means.

A modification, which may prove desirable in practice, of the method just described is illustrated in Figs. 24 and 25. The connecting piece 20ª instead of being a thimble, closed at its inner end, is left in the form of an open ended pipe. The operation of joining the two pipes 8, 9 and a connecting piece 20ª to each other is performed in precisely the same way as just described. After this operation, the pipe 20ª is cut off close to its base and closed as clearly shown in Fig. 25.

In the description up to this point, the connecting piece 20 or 20ª is assumed to be of the same diameter as the two pipes 8 and 9. By modifying the dies suitably, a pipe of larger diameter can evidently be employed. This is illustrated in Figs. 26 and 27. It is believed that no detailed description is required. If it is desired, the structure resulting may be again flattened as indicated in Fig. 28. By taking a connecting pipe of suitable size, the distance between pipes 8 and 9 may be increased to any desired distance within limits.

What I claim is:

1. A die for making pipe bends and similar structures comprising a female member having parallel bores for holding two pipe lengths, said bores being joined by a space opening from the end of the die, said bores being spaced apart so their axes are separated by a distance materially greater than one half of the circumference of either bore, and a male member having two legs for entering said bores, said legs being connected by a web, the male member being shaped generally complementary to the co-operating portions of the female member, but being, when inserted in it, spaced everywhere from its walls.

2. A die for making pipe bends and similar structures comprising a female and male member; the female member comprising two symmetrical halves whose co-operating faces are of such conformation that when the die is closed, there are formed two cylindrical bores, whose axes are parallel and lie in the plane of the contiguous surfaces and are separated from each other by a distance materially greater than one half of the circumference of either bore, the bores being connected by a space opening from one end of the female die; the male member comprising two legs and a connecting web joining them, the male member being shaped generally complementary to the co-operating portions of the female member but smaller, so that when inserted in it the male member is everywhere spaced from the walls of the female member.

3. A die for making pipe bends and similar structures comprising a female and a male member; the female member comprising two symmetrical halves whose co-operating faces are of such conformation that when the die is closed, there are formed three cylindrical bores, whose axes are parallel and lie in the plane of the contiguous surfaces, the outer two bores extending from one end of the die and the middle one from a point removed from the end, the three bores being connected by a space extending from the other end of the die and terminating short of the bottom of the middle bore; the male member comprising three legs spaced to correspond to the spacing of the bores, and webs connecting them, the male member being shaped generally complementary to the co-operating portions of the female member but smaller, so that when inserted in it the male member is everywhere spaced from the walls of the female member.

GILBERT E. RYDER.